United States Patent
Peng

(10) Patent No.: US 9,830,418 B2
(45) Date of Patent: Nov. 28, 2017

(54) CLOCK-TREE TRANSFORMATION IN HIGH-SPEED ASIC IMPLEMENTATION

(71) Applicant: Taiwan Semiconductor Manufacturing Company, Ltd., Hsin-Chu (TW)

(72) Inventor: Ray Chih-Jui Peng, San Jose, CA (US)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 80 days.

(21) Appl. No.: 14/924,542

(22) Filed: Oct. 27, 2015

(65) Prior Publication Data

US 2016/0048626 A1    Feb. 18, 2016

Related U.S. Application Data

(60) Continuation of application No. 14/677,776, filed on Apr. 2, 2015, now Pat. No. 9,172,377, which is a continuation of application No. 13/776,045, filed on Feb. 25, 2013, now Pat. No. 9,007,094, which is a division of application No. 12/987,652, filed on Jan. 10, 2011, now Pat. No. 8,384,436.

(51) Int. Cl.
    *G06F 17/50*    (2006.01)
    *G06F 1/10*     (2006.01)
    *H03K 19/096*   (2006.01)

(52) U.S. Cl.
    CPC ........... *G06F 17/5077* (2013.01); *G06F 1/10* (2013.01); *G06F 17/505* (2013.01); *G06F 17/5072* (2013.01); *G06F 17/5081* (2013.01); *H03K 19/096* (2013.01); *G06F 2217/62* (2013.01); *G06F 2217/84* (2013.01)

(58) Field of Classification Search
    None
    See application file for complete search history.

(56) References Cited

U.S. PATENT DOCUMENTS

| | | |
|---|---|---|
| 6,088,254 A | 7/2000 | Kermani |
| 6,204,695 B1 | 3/2001 | Alfke et al. |
| 6,275,081 B1 | 8/2001 | Flake |
| 7,068,080 B1 | 6/2006 | Sanders |
| 7,461,365 B1 | 12/2008 | Galbi et al. |
| 7,617,409 B2 * | 11/2009 | Gilday ............... G06F 1/10 326/93 |
| 7,795,943 B2 * | 9/2010 | Toyonoh ........... G06F 17/5068 326/93 |

(Continued)

*Primary Examiner* — Crystal L Hammond
(74) *Attorney, Agent, or Firm* — Slater Matsil, LLP

(57) ABSTRACT

A method includes providing a first clock tree including a root clock and a plurality of levels of integrated clock gates (ICGs) under the root clock. The plurality of levels of ICGs in the first clock tree is flattened to generate a second clock tree including a plurality of ICGs in a same level under the root clock. A fake module is formed to reserve a region between the root clock and the plurality of ICGs. The fake module includes the root clock as a first input, and a first plurality of outputs coupled to clock-inputs of the plurality of ICGs. A skew balancing is performed on the second clock tree using a clock tree synthesis (CTS) tool to generate a third clock tree, wherein no buffers are inserted into the fake module, and wherein buffers are inserted by the CTS tool under the plurality of ICGs.

20 Claims, 9 Drawing Sheets

(56) References Cited

U.S. PATENT DOCUMENTS

| | | | |
|---|---|---|---|
| 8,205,182 B1* | 6/2012 | Zlatanovici | G06F 17/505 703/16 |
| 2002/0175699 A1 | 11/2002 | Kohno | |
| 2004/0196081 A1* | 10/2004 | Srinivasan | G06F 1/10 327/165 |
| 2008/0066043 A1 | 3/2008 | Lin | |
| 2008/0263488 A1 | 10/2008 | Banerji et al. | |

* cited by examiner

CLOCK-TREE TRANSFORMATION IN HIGH-SPEED ASIC IMPLEMENTATION

PRIORITY

This application is a continuation of U.S. patent application Ser. No. 14/677,776, filed on Apr. 2, 2014, and entitled "Clock-Tree Transformation in High-Speed ASIC Implementation," which is a continuation of U.S. patent application Ser. No. 13/776,045, filed on Feb. 25, 2013, and entitled "Clock-Tree Transformation in High-Speed ASIC Implementation," now U.S. Pat. No. 9,007,094 issued on Apr. 14, 2015, which is a divisional of U.S. patent application Ser. No. 12/987,652, filed Jan. 10, 2011, and entitled "Clock-Tree Transformation in High-Speed ASIC Implementation," now U.S. Pat. No. 8,384,436 issued on Feb. 26, 2013 which applications are incorporated herein by reference.

BACKGROUND

In synchronized circuits, a clock tree is generally used for the purpose of distributing a common clock signal to many sequential elements, which include flip flops, latches, and memories, so that the sequential elements have a uniform timing. Manual-based structures like H tree meshes, and tool-based balanced buffer trees are widely used in the clock trees for the distribution of the clock signal.

Differences in the arrival of the clock signal at two or more clocked elements can result in errors in the synchronous system. Clock skew is the difference in the time points of the clock signal arriving at different clock-receiving units such as flip flops. The clock skew can cause errors in the synchronous system as the clocked elements are triggered at different points in time. One such error is called hold violation, which occurs when the clock skew between two sequentially connected flips flops is greater than the data propagation delay from the first flip flop to the second flip flop; allowing data at the first flip flop output to race through the second flip flop and bypassing a full clock cycle.

The clock skew is always a major obstacle for high-speed circuit design. Conventionally, to reduce the clock skew in ASIC implementations, clock-tree synthesis tools, such as Synopsys' CTS tool, were used to balance the clock tree. The CTS tools insert and adjust buffers along the paths into different leaf points of the clock tree, so that the clock signal arrives at the leaves of the clock tree at substantially the same time. The CTS tools balance the clock tree under the constraint that the clock insertion delay, defined as the time elapsed from the clock arrival at the root of the tree to the arrival at the leaf points does not exceed certain budget. This is because a long insertion delay leads to undesirable, high clock tree power consumption. Also, clock trees with long insertion delays are more susceptible to manufacturing on-chip variation (OCV), which injects uncertainty in the clock insertion delay, exacerbating the clock skew problem. The clock insertion delay budget, in general, places a limit on the amount of clock skew that CTS tools are able to reduce.

With the advancement in the integrated circuits, faster circuits are manufactured. For example, embedded ASIC cores have achieved a very high-speed such that the solution provided by the CTS tools can no longer meet the clock skew requirement of the high-speed circuits. To overcome the problem, many resort to manual design methods to form H trees and mesh structures, which are common in traditional high-end CPU designs. This may generate clock trees with small clock skews. However, due to the huge size of some circuits, it may take very long time to perform the manual design, and the time-to-market is significantly affected.

Another difficulty in adopting H tree-/mesh-based clock trees in ASIC implementation is caused by the widespread use of the integrated clock gates (ICGs) for power reduction. The ICGs, which may be inserted into the clock tree manually by designers or automatically by synthesis tools, save power by shutting off sections of clock tree that are not required for an operation, preventing the controlled logic from toggling and consuming power. Because ICG inputs and outputs are logically distinct, inserting ICGs into the clock trees render the tree fragmented and unsuited for H tree-/mesh methodology, which can only be applied on an un-fragmented net.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

A novel clock tree transformation method is provided in accordance with an embodiment. The variations and the operation of the embodiment are discussed. Throughout the various views and illustrative embodiments, like reference numbers are used to designate like elements. Throughout the description, a flip flop is referred to as being "under" an integrated clock gate (ICG) or a buffer if the flip flop is at least one level under, and receives a clock signal from the respective ICG/buffer. In addition, although flip flops are used as exemplary clock-driving units, other clock-sinking units that receive, and are driven by, the clock signals may be used.

Figure 1:
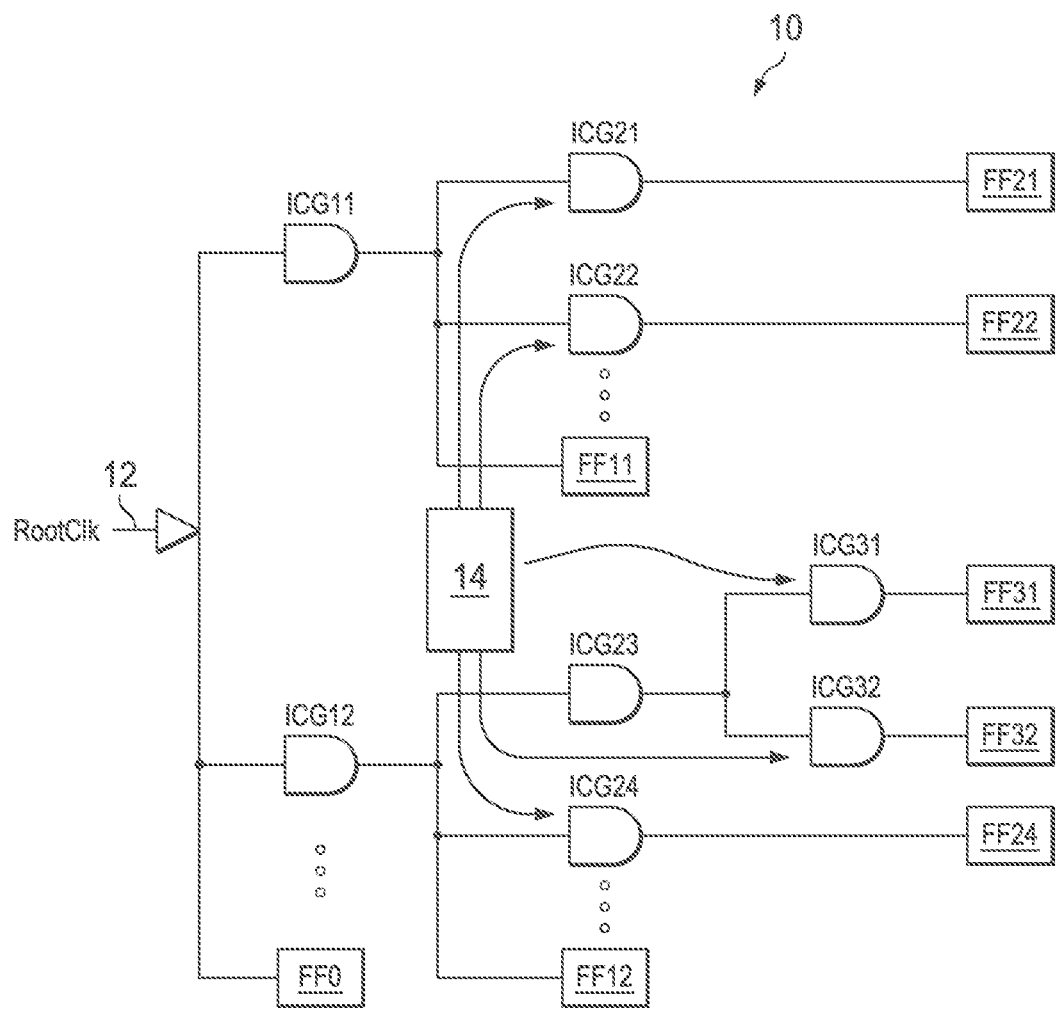
FIG. 1 illustrates a clock tree with multiple levels of integrated clock gates (ICGs)

FIGS. 1 through 7 briefly illustrates the transformation of a clock tree, which may be in a legacy core, to a clock tree having low clock skews. The resulting clock tree is suitable for being used in high-speed circuits, such as ASIC embedded circuits. FIG. 1 illustrates clock tree 10. In an embodiment, clock tree 10 is a clock tree for a legacy core. Root clock 12 is provided to the clock tree, and is supplied to ICGs ICG11, ICG12, ICG23, etc., and free running flip flops (FFs), which are symbolized as FF0. First-level ICGs ICG11 and ICG12 are immediately under root clock 12. Second-level ICGs ICG21, ICG22, ICG23, and ICG24 are immediately under, and receive clock signals from, first-level ICGs ICG11 and ICG12. It is noted that there may be many additional ICGs in the first level and second level. In addition, there may be more levels of ICGs, although two levels are shown. Under each level of ICGs, there may be clock-gated flip flops (FF) such as FF11, FF12, FF21, FF21, FF22, FF24, and the like. It is further noted that although only one flip flop is illustrated under each ICG, the illustrated flip flop represents one or a plurality of flip flops that is under the same ICG.

In an embodiment, a clock tree may need to be transformed to enable a low-power operation with an additional level of clock-gating before the subsequent flattening is performed. Accordingly, some low-level ICGs may be inserted first. In an exemplary embodiment, an originally provided clock does not include some of low-level ICGs, such as ICGs ICG21, ICG22, ICG31, ICG32, and ICG24, while other ICGs such as ICG11, ICG12, and ICG23 were originally included. The ICG insertion may be performed by either a logic synthesis tool, such as Synopsys' Design Compiler, or a power optimization tool, such as Synopsys' Power Compiler. It may also be performed manually. Logic synthesis tool 14 inserts ICGs to locations where they are needed, for example, one level higher than the leaf flip flops, so that the resulting clock tree 10 has a reduced power consumption. In the illustrated exemplary embodiment, ICGs ICG21, ICG22, ICG31, ICG32, and ICG24 are inserted.

Figure 2:
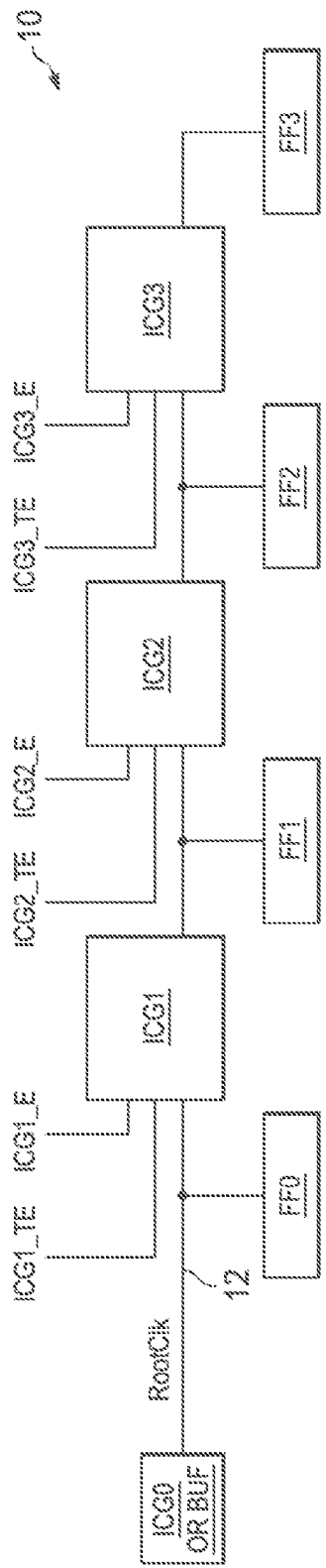
FIG. 2 illustrates a simplified, alternative view of the multi-level clock tree as shown in FIG. 1 with one ICG per level.

FIG. 2 illustrates an alternative block diagram of clock tree 10 as shown in FIG. 1. The illustrated ICG1 represents all first-level ICGs (such as ICG11 and ICG12) in FIG. 1. The illustrated ICG2 represents all second-level ICGs (such as ICG21, ICG22, ICG23, and ICG24) in FIG. 1. The illustrated ICG3 represents all third-level ICGs (such as ICG31 and ICG32) in FIG. 1. FIG. 2 also illustrates enable signals ICG1_E, ICG1_TE, ICG2_E, ICG2_TE, ICG3_E, and ICG3_TE, wherein the letters "E" and "TE" following the respective ICG notations represent "Enable" signals and "Test Enable" signals, respectively. The respective inputs of the ICGs and buffers are thus referenced to as "enablement" signals and "test enablement" inputs.

Figure 3:
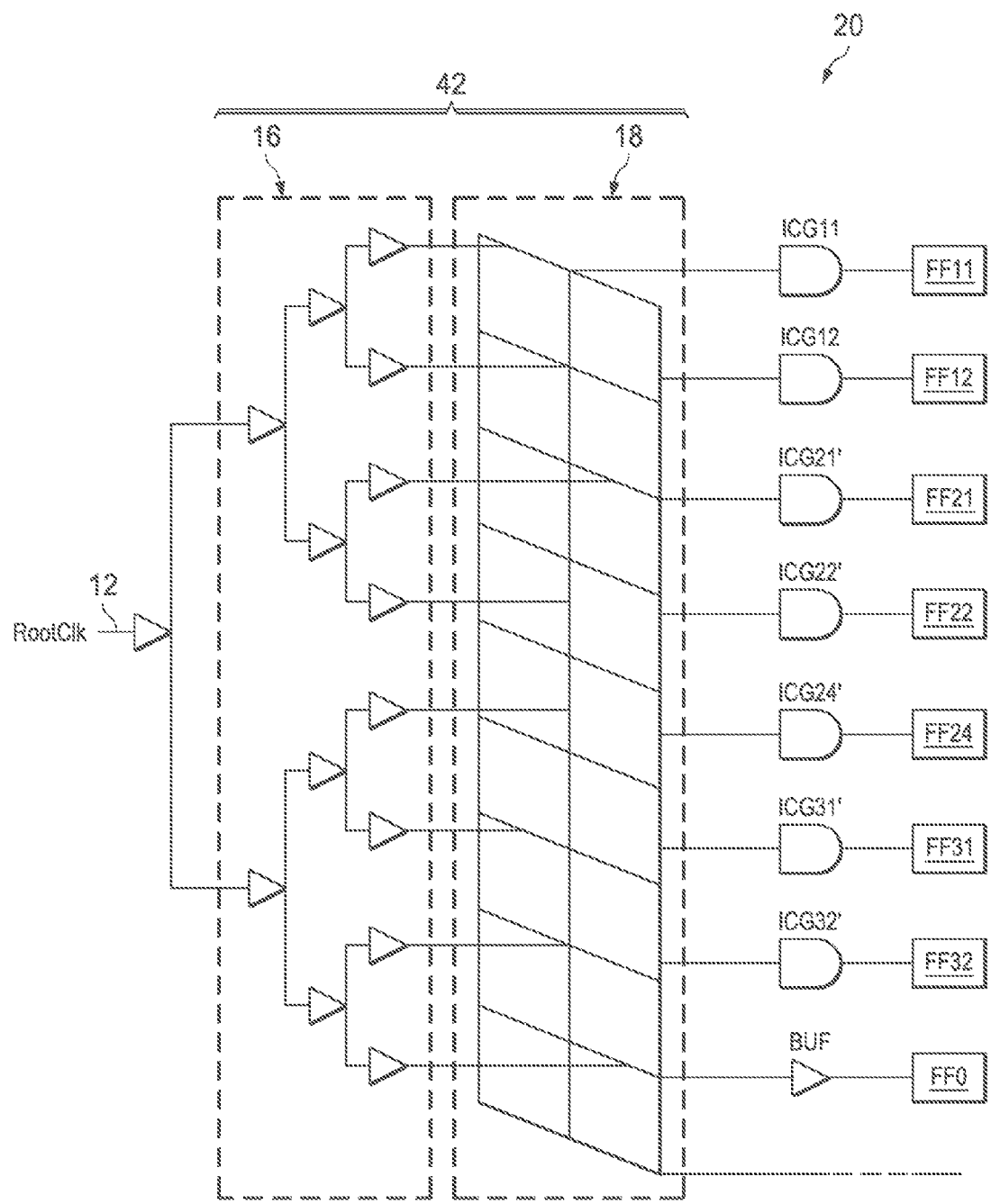
FIG. 3 schematically illustrates a block diagram of a clock tree implemented in accordance with embodiments, wherein the clock tree does not include buffers inserted by a clock tree synthesis (CTS) tool.

By applying the clock transformation methods pertaining to the embodiments, clock tree 20 as shown in FIG. 3 is to be formed. Clock tree 20 receives root clock 12, and distributes root clock 12 to H trees 16. Optionally, mesh structure 18 may be added to receive the clocks from H trees 16, although mesh structure 18 may also be omitted. H trees 16 and the optional mesh structure 18 in combination are also referred to as root clock distribution network 42 throughout the description. In the transformation from clock tree 10 as shown in FIG. 1 to clock tree 20 as shown in FIG. 3, clock tree 10 is flattened, so that the resulting clock tree 20 include no more than one level of ICGs and buffers. The prime sign "'" is used in FIG. 3 following the notations of ICGs to indicate that the ICGs in FIG. 3 have been modified from the respective ICGs in FIG. 1. For example, ICG31' as in FIG. 3 actually combines the function of ICG23 and ICG31 in FIG. 1. Each of the ICGs in the flattened clock tree 20 receives the root clock 12 from root clock distribution network 42 directly. Further, buffers (represented by a buffer denoted as "BUF") are added for the flip flops FF0 that are not under any ICG. The clock signals received by the ICGs in FIG. 3 are not gated by any additional ICGs. The clock tree transformation steps for forming clock tree 20 as shown in FIG. 3 is discussed as follows and illustrated in FIGS. 4A through 7.

Figure 4A:
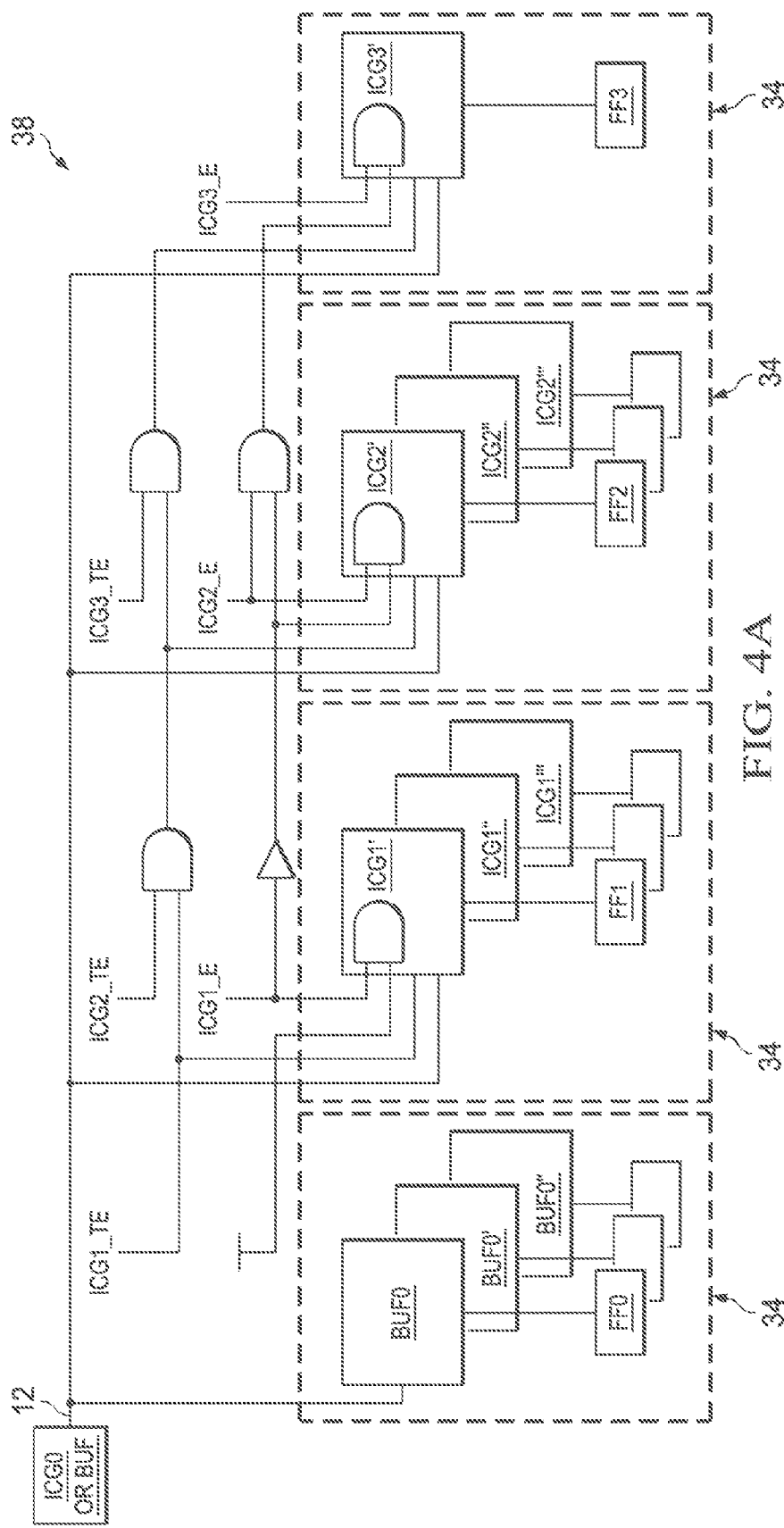
FIG. 4A illustrates a flattened clock tree generated from the clock tree shown in FIG. 2.

First, as shown in FIG. 4A, clock tree 10 as shown in FIGS. 1 and 2 is flattened, generating clock tree 38. The flattening may be performed by running a script, for example, although any other applicable methods may be used. After the flattening, there is only one level of ICGs including ICG1', ICG2', ICG3', and the like. Again, each of ICGs ICG1', ICG2', and ICG3' may actually represent a group of ICGs transformed from ICGs previously in the same level before the flattening. For example, the illustrated ICG1' represents ICGs ICG11 and ICG12 in FIG. 3, the illustrated ICG2' represents ICGs ICG21', ICG22', and ICG24' in FIG. 3, and the illustrated ICG3' represents ICGs ICG31' and ICG32' in FIG. 3. The buffers represented by BUF0 are also added to balance the time delay, so that the clock signal reaches the free running flip-flops FF0, which are directly under root clock 12, at roughly the same time as the time point the clock signal reaches the flip flops under ICGs ICG1', ICG2', and ICG3'. Similarly, each of the illustrated flip-flops FF0, FF1, FF2, and FF3 may represent a plurality of flip flops.

For the flip flops under ICGs such as ICG1', ICG2', and ICG3', and the flip flops under BUFs such as BUF0, a cloning may be performed to balance the loading, so that the number of flip flops under each of ICGs ICG1', ICG2', and ICG3' and buffer(s) BUF0 are in a pre-defined range. The excess flip flops under ICGs ICG1', ICG2', and ICG3' are re-distributed to cloned ICGs. For example, ICGs ICG1" and ICG1''' are cloned from ICG ICG1', and ICGs ICG2" and ICG2''' are cloned from ICG ICG2'. The cloned ICGs share the same enablement signals as the respective ICGs they are cloned from. For example, the cloned ICGs ICG1" and ICG1''' share the same enablement signals ICG1_E and ICG1_TE with ICG ICG1'. The excess number of flip flops (such as FF1) that were originally under one ICG, for example, ICG1', may now by spread to under the cloned ICGs such as ICG1" and ICG1'''. In an embodiment, no cloning is performed to ICGs ICG3'. This is because ICG3' was transformed from ICG3, which was inserted by a tool for power-saving. Typically, a load range is given for the insertion such that there is no need for cloning in the flattening process.

Similar to the cloning of ICGs, buffers are also cloned to balance loading. For example, buffers BUF0' and BUF0" are cloned from buffer BUF0, and the flip flops originally under buffers BUF0 were re-distributed to the cloned buffers BUF0' and BUF0", so that the numbers of flip flops directly under all buffers and ICGs are in the similar range. Throughout the description, an ICG (or buffer) and the corresponding cloned ICGs (or buffers) and the respective flip flops under the ICG and the cloned ICGs are referred to as being in a same group denoted as an ICG/buffer/FF group. FIG. 4A illustrates a plurality of ICG/buffer/FF groups 34.

Figure 4B:
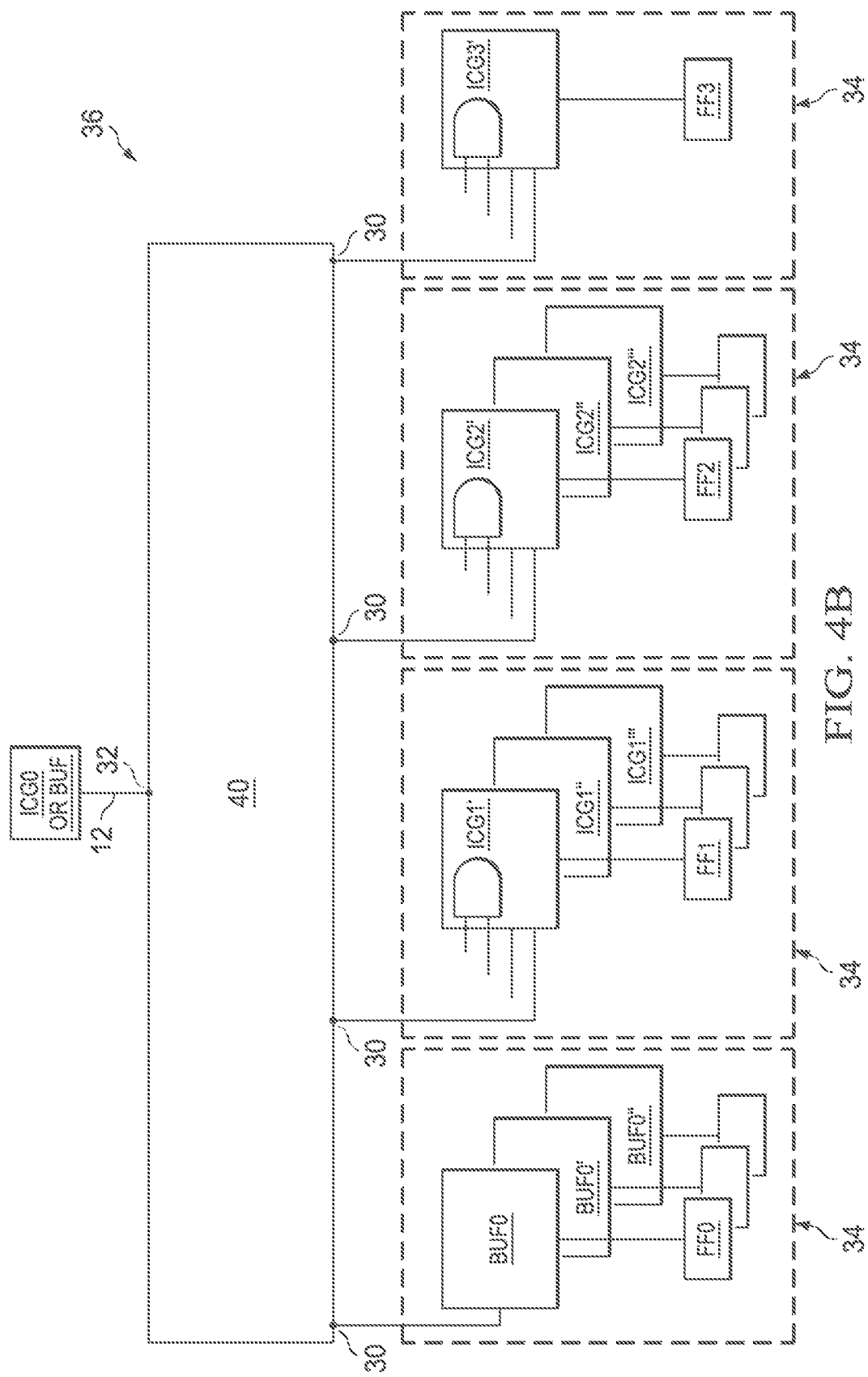
FIG. 4B illustrates the formation of a fake module during the placement stage of chip layout to substitute the root clock net in FIG. 4A.

ICG/buffer/FF groups 34 as shown in FIG. 4A are then transformed to a layout. FIG. 4B schematically illustrates chip representation 36, which is the layout of a physical chip, but is not a physical chip itself. The layout of chip representation 36, however, will be later implemented on a physical chip. ICG/buffer/FF groups 34 as shown in FIG. 4A are laid out in chip representation 36. The physical locations of clock-input pins 30 (please refer to FIG. 8) of ICG/buffer/FF groups 34 in die representation 36 are thus known. Further, the element (denoted as "ICG0 or BUF") that outputs root clock 12 is laid out, and hence the physical location of output pin 32 is also known. The necessary metal connections for the layout are placed and routed.

Figure 5:
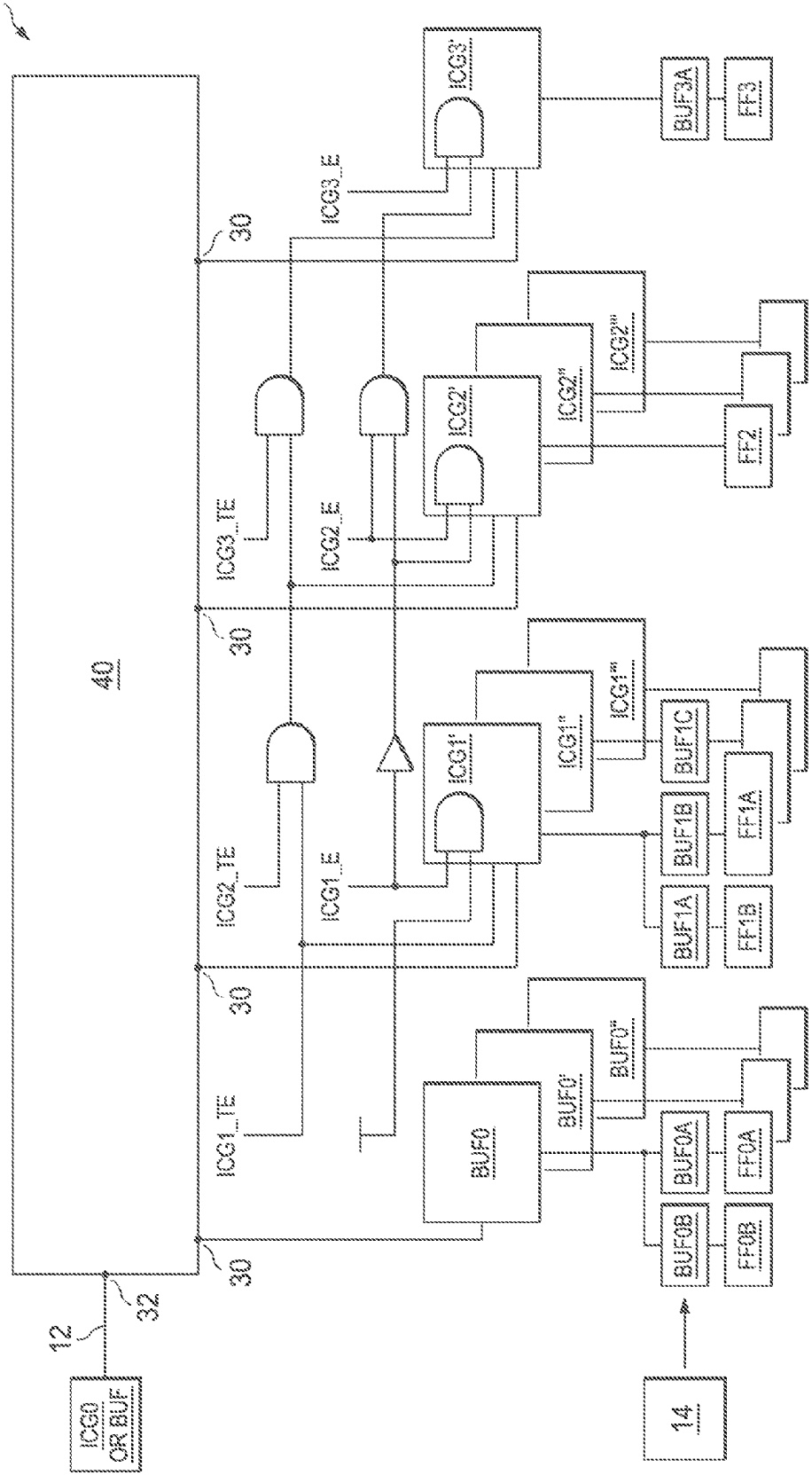
FIG. 5 illustrates the skew balancing performed on the clock tree, wherein during the skew balancing, no buffers are inserted into the fake module.

After the step as shown in FIG. 4B, the locations of pins 30 and 32 in die representation 36 can be extracted. A die region (also referred to as a fake module), which is marked as region 40, is reserved, wherein die region 40 has the boundaries interfacing pins 30 and 32. FIG. 5 illustrates the circuit diagram obtained from the clock tree shown in FIG. 4A, wherein fake module is inserted. Fake module 40 includes the region between the output pin 32 of ICG0 and input pins 30 of ICGs/buffers groups 34. The resulting clock tree in FIG. 5 is denoted as clock tree 44, which is an intermediated clock tree. Fake module 40 has interface pins overlapping pins 30 and 32. Therefore, as shown in FIGS. 4B and 5, physically, fake module 40 represents a die region in die representation 36 (FIG. 4B), while logically, fake module 40 represents the level between root clock 12 and the buffers/ICGs generated in the flattening and cloning steps (FIG. 5).

The design as shown in FIG. 5, including the location of pins 30 and 32, is then provided to CTS tool 14 to perform a skew balancing. In the skew balancing, there are two types of flip flops that need to be skew-balanced, the flip flops FF0 under buffers BUF, and the flip flops under ICGs such as FF1 and FF2. The skew balancing is to balance the clock insertion delay under each of ICGs and under each of buffers BUFs, which ICGs/buffers are directly under the root clock with no additional buffers/ICGs therebetween, so that the clock insertion delay under the ICGs or buffers are in a similar range. For example, after the flattening stage of this embodiment that transforms clock tree 10 to clock tree 38, there are clock skews in each ICG group. Also, because the number of flip flops in each ICG group could vary between, for example, 4 and 32, the skews are likely to be different between different ICG groups. To balance the skew under buffers BUF0, additional buffers such as BUF0A and BUF0B may be inserted below each or some of buffers BUF0, and flip flops FF0 (FIG. 4A) may be evenly redistributed to under BUF0B and BUF0B as FF0A and FF0B (FIG. 5). Additional buffers such as BUF1A and BUF1B may also be inserted below each or some of ICGs such as ICG1', and flip flops FF1 (FIG. 4A) may be evenly redistributed to under BUF1A and BUF1B as FF1B and FF1A (FIG. 5). In addition, more buffers such as BUF0C and BUF3A may be inserted to add delay.

In an embodiment, in the skew balancing step, CTS tool 14 does not insert any buffer to the region reserved for fake module 40. Alternatively stating, all of the inserted buffers will be at the level under the ICGs and buffers that receive the clock output from fake module 40, and no buffers are inserted at the level higher than the ICGs. In die representation 36 (FIG. 4B), no buffers will be laid out in die region 40 and connected to pins 30 and/or 32.

CTS tool 14 inserts buffers to balance the skew for all buffers and ICGs, so that the delays between the leaf flip flops and the buffers and ICGs one level above them are substantially the same. It is realized that because of the existence of the fake module, CTS tool 14 is able to view all ICGs at the same time from the view point of root clock 12. Accordingly, if CTS tool 14 is to run the skew balancing separately for each ICG, the results obtained from the multiple runs will not likely be the same as each other. By invoking the CTS to perform skew balancing of all ICGs in one shot, the embodiments enable the reduction of clock skew to a very low level that satisfies the requirement of very fast circuits such as ASIC embedded circuits. On the other hand, by using CTS tool 14 to perform the skew balancing rather than performing this task manually, the most time-consuming work may be performed rapidly.

Figure 6:
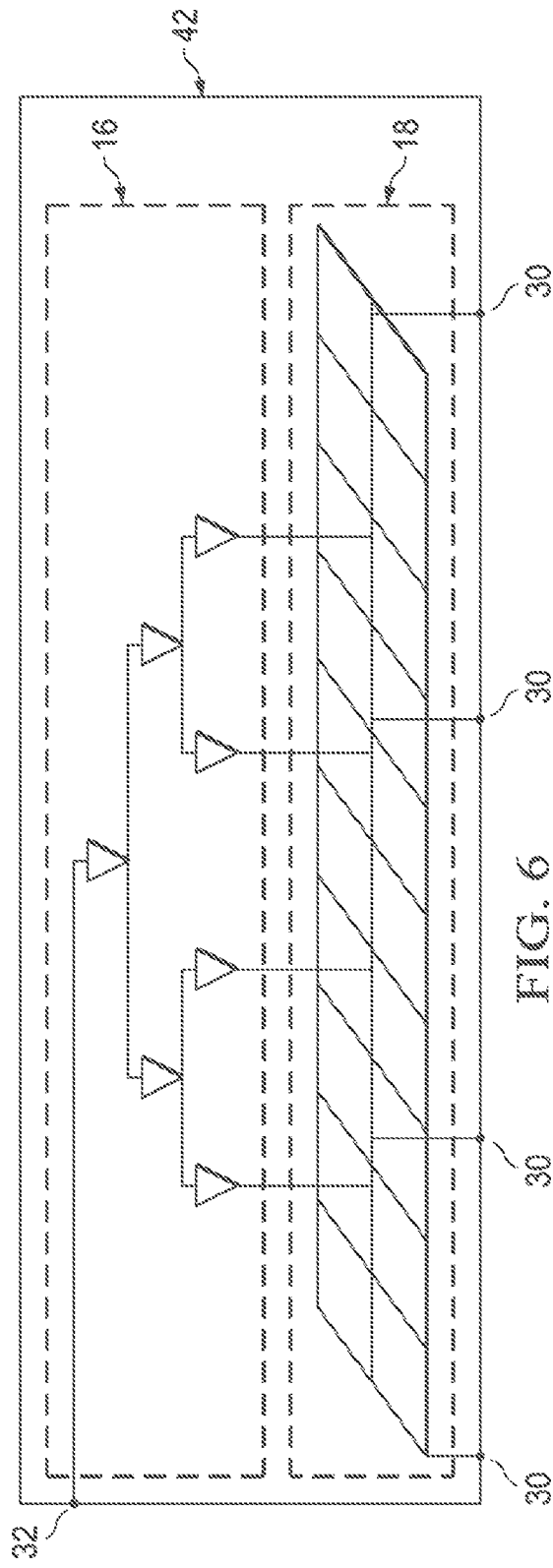
FIG. 6 illustrates a clock distributing network comprising H trees and a mesh structure for the root clock.

FIG. 6 illustrates the design of root clock distribution network 42, which includes H trees 16 and optional mesh 18. Since the design work of H trees 16 and mesh 18 is relatively less labor-extensive, it may be performed manually without the concern of significantly affecting time-to-market. Alternatively, a tool may be used to design H trees 16 and mesh 18. Since the locations of pins 30 and 32 as shown in FIG. 5 is known, root clock distribution network 42 may have the same root clock pin location as pin 32 as shown in FIG. 4B, and the output pin locations of root clock distribution network 42 also match the locations of clock-input pins 30 as shown in FIG. 4B. It is appreciated that the design of root clock distribution network 42 as shown in FIG. 6 may be performed before, after, or simultaneously as, the skew balancing work as shown in FIG. 5.

Figure 7:
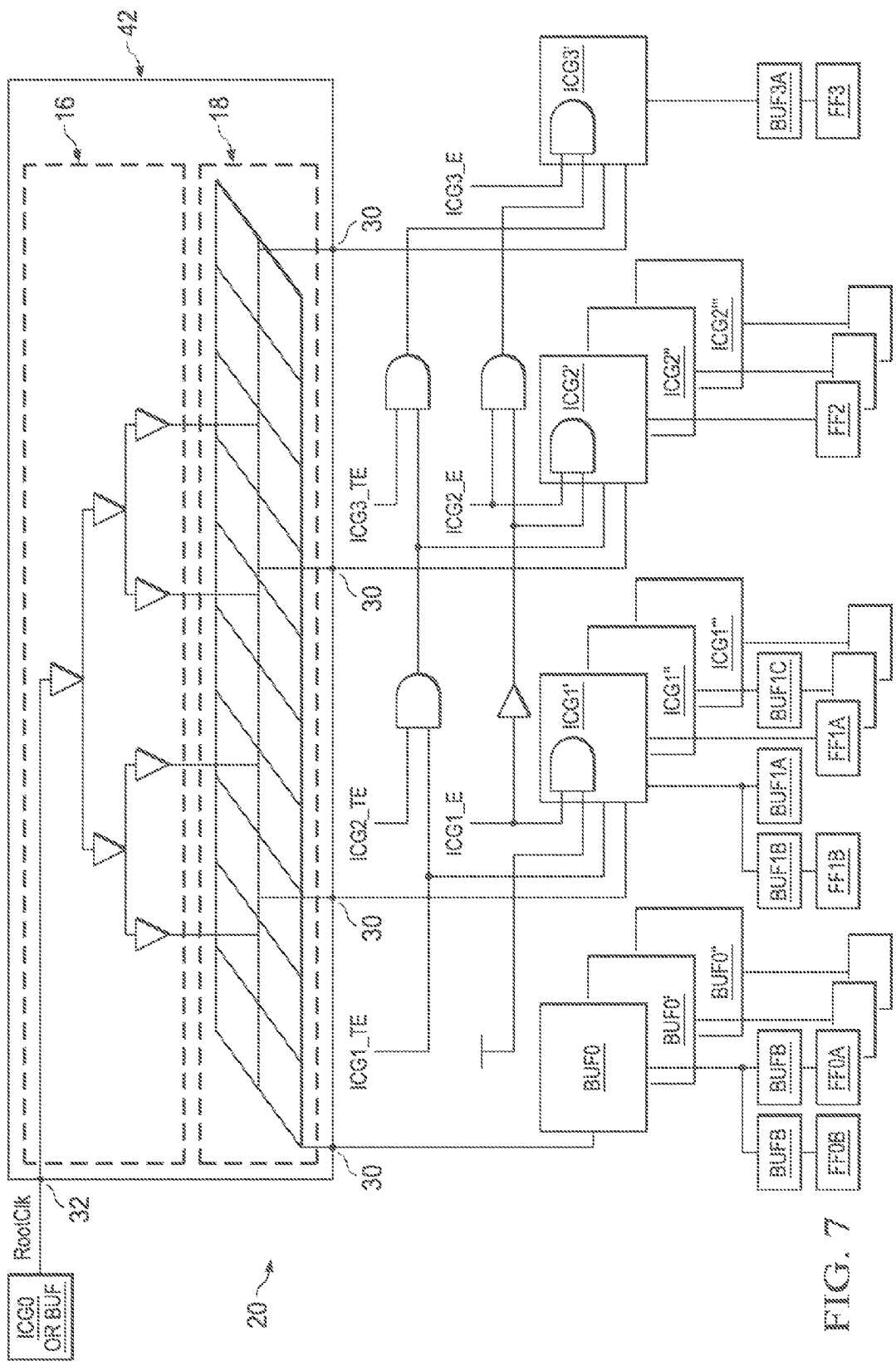
FIG. 7 illustrates the replacement of the fake module with the clock distributing network.

Fake module 40 as shown in FIG. 5 is then replaced with root clock distribution network 42 as shown in FIG. 6, and clock tree 20 as shown in FIG. 7 is generated. The resulting clock tree 20 is also the clock tree 20 as shown in FIG. 3, except that some details such as cloned ICGs and inserted buffers are not shown in FIG. 3. Since the pin locations of fake module 40 match the pin locations of root clock distribution network 42, root clock distribution network 42 may be integrated with the structure as shown in FIG. 5 seamlessly.

Figure 8:
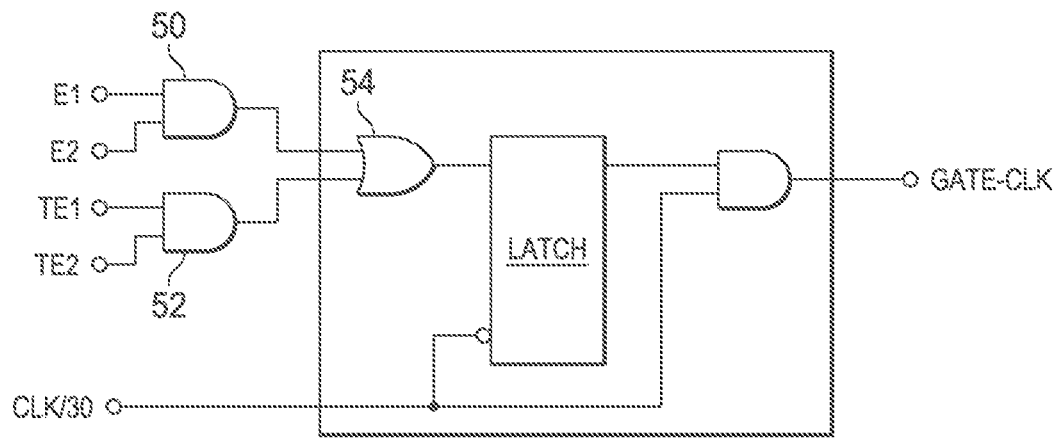
FIG. 8 illustrates an enablement signal test circuit for combining enablement signals and test enablement signals in the flattening of a clock tree.

Referring back to FIG. 4A, it is realized that to flatten a clock tree, the enable signals needs to be processed appropriately. For example, referring to FIG. 4A, to enable ICG2, both the enablement signals ICG1_E and ICG2_E (also refer to FIG. 2) need to be enabled (to have logic high signals, for example). To ensure this condition is met, in the flattened clock tree as shown in FIG. 4A, an "AND" operation need to be performed on the enablement signals ICG1_E and ICG2_E, and an "AND" operation needs to be performed to the test enablement signals ICG1_TE and ICG2_TE. FIG. 8 illustrates a block diagram of an enablement signal test circuit for checking these conditions, wherein AND gates 50 and 52 are used to check enablement signals "E1" (which may be ICG1_E, for example) and "E2" (which may be ICG2_E, for example) and to check the test enablement signals "TE1" and "TE2." When either ((E1&E2)==1) or ((TE1&TE2)==1) is satisfied, the input-clock received at the clock-input clk/30 of the respective ICG is sent to output gate-clk.

Figure 9:
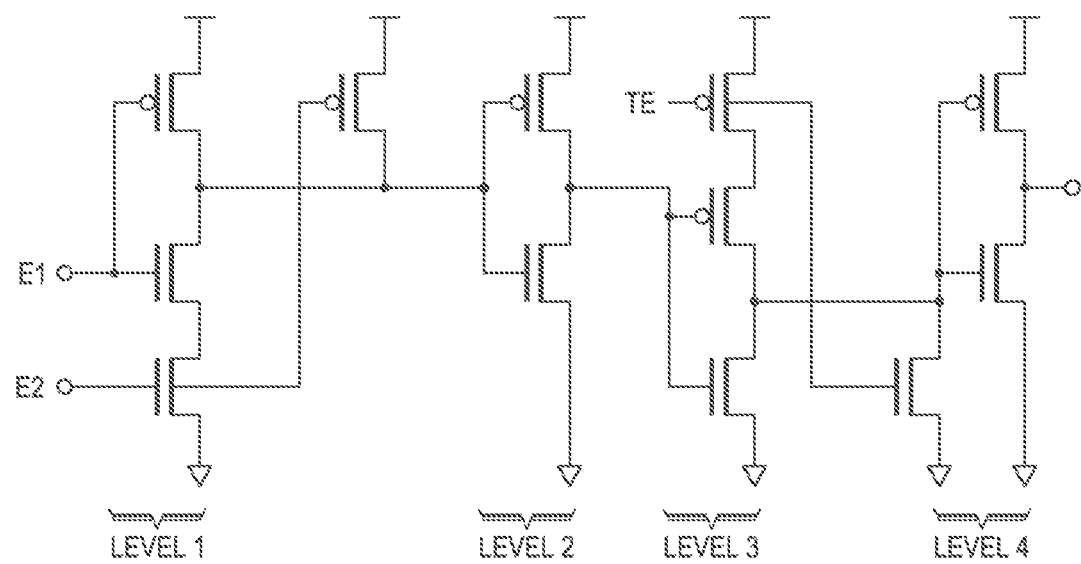
FIG. 9 illustrates an exemplary circuit implementation of the circuit diagram shown in FIG. 8.

It is realized, however, in an implementation of the circuit as shown in FIG. 9, each of AND gates 50 and 52 needs to be implemented with two levels of inverters/toggles (marked as level 1 and level 2), and OR gate 54 also needs to be implemented with two levels of inverters (marked as level 3 and level 4). The time for checking the enablement signals is thus long. While the extra delay may not present a problem to the test enablement signals "TE1" and "TE2", it will very likely introduce new timing problems to the enablement signals "E1" and "E2". This is because these two signals are used as functional enables and are usually slow to produce in the actual chip.

Figure 10:
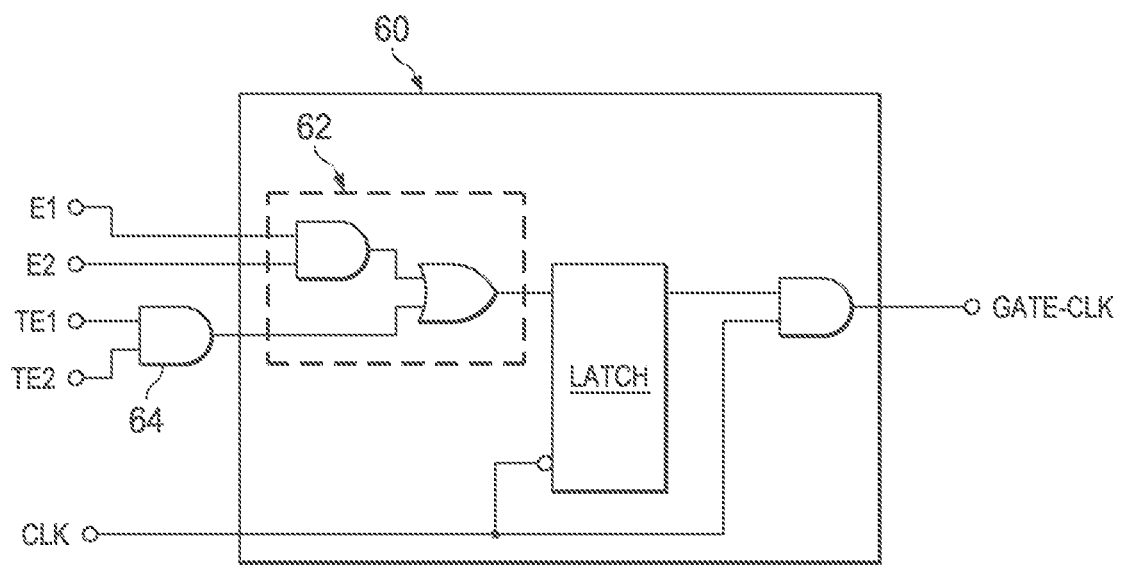
FIG. 10 illustrates an ICG comprising an enablement signal test circuit for combining the enablement signals and the test enablement signals in the flattening of a clock tree, wherein an AND-OR gate is built inside the ICG.

FIG. 10 illustrates an implementation scheme for solving the timing issue. A new ICG 60 is provided, wherein ICG 60 includes AND-OR gate 62, which is built inside ICG 60. The inputs of AND-OR gate 62 receive enablement signal E1 and E2. AND gate 64 is outside ICG 60, and is used to ensure that test enablement signals TE1 and TE2 meet the requirements.

Figure 11:
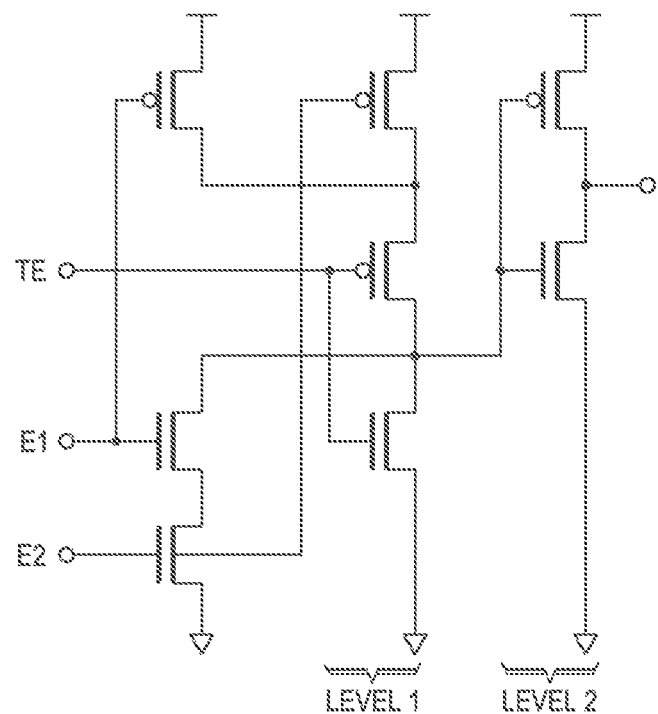
FIG. 11 illustrates an exemplary circuit implementation of the circuit diagram shown in FIG. 10.

FIG. 11 illustrates an exemplary implementation of AND-OR gate 62. It is observed that only two inverter/toggle levels, level 1 and level 2, are used. Accordingly, AND-OR gate 62 is faster than the combination of AND gate 50 and OR gate 54 as shown in FIG. 8, and there is no new timing issue introduced. The ICG 60 as shown in FIG. 9 is used as the ICGs in each of FIGS. 3 through 7.

In the embodiments, by flattening clock trees without allowing buffers to be inserted above the flattened buffers and ICGs, CTS tools may be used to perform the labor-intensive skew balancing work. Further, with the clock trees being flattened, the H trees and the mesh structure may be designed manually. Accordingly, the methods pertaining to the embodiments enable the reduction of clock skews of the clock tree to a very low level.

In accordance with embodiments, a method includes providing a first clock tree including a root clock and a plurality of levels of ICGs under the root clock. The plurality of levels of ICGs in the first clock tree is flattened to generate a second clock tree including a plurality of ICGs in a same level under the root clock. A fake module is formed to reserve a region between the root clock and the plurality of ICGs. The fake module includes the root clock as a first input, and a first plurality of outputs coupled to clock-inputs of the plurality of ICGs. A skew balancing is performed on the second clock tree using a CTS tool to generate a third clock tree, wherein no buffers are inserted into the fake module, and wherein buffers are inserted by the CTS tool under the plurality of ICGs.

In accordance with other embodiments, a method includes providing a first clock tree including a plurality of levels of ICGs. The plurality of levels of ICGs is flattened to generate a second clock tree including a plurality of ICG groups at a same level and under a root clock of the second clock tree. The plurality of ICG groups in the second clock tree is placed and routed in a die representation. A pin location of the root clock and pin locations of clock-inputs of the ICG groups are extracted from the die representation. A fake module is formed to reserve a region of the die representation, wherein the region is between the pin location of the root clock and the pin locations of clock-inputs of the ICG groups. A clock distribution network having H trees is designed, wherein the clock distribution network has an input pin and a plurality of output pins, with a location of the input pin matching the pin location of the root clock, and pin locations of the plurality of output pins matching the pin locations of the clock-inputs of the ICG groups. The fake module is replaced with the clock distribution network to generate a third clock tree, with the input pin of the clock distribution network connected to the root clock, and the plurality of output pins of the clock distribution network matching respective ones of the clock-inputs of the ICG groups.

In accordance with yet other embodiments, an ICG includes a first enablement input; a second enablement input; an AND-OR gate comprising a first, a second, and a third input, wherein the first and the second inputs of the AND-OR gate are coupled to the first and the second enablement inputs, respectively; a clock input; and a clock output.

In some aspects, embodiments described herein provide for a method generating out an integrated circuit. The method includes providing a first clock tree comprising a root clock and a plurality of levels of integrated clock gates (ICGs) under the root clock and generating from the first clock tree a second clock tree comprising a plurality of ICGs in a same level under the root clock. The method further includes reserving a region of the integrated circuit between the root clock and the plurality of ICGs, the region including a first interface pin location for the root clock as a first input, and an plurality of second interface pin locations for respective outputs coupled to clock-inputs of the plurality of ICGs. The method yet further includes generating from the second clock tree a third clock tree by inserting buffers under respective ones of the plurality of ICGs for balancing skew, wherein no buffers are inserted into the reserved region, and implementing the integrated circuit on a physical chip.

In another aspect, embodiments described herein may provide for a method including providing a first clock tree comprising a plurality of levels of integrated clock gates (ICGs) and flattening the plurality of levels of ICGs in the first clock tree to generate a second clock tree comprising a plurality of ICGs groups at a same level and under a root clock of the second clock tree. The method further includes placing and routing the plurality of ICGs groups in the second clock tree in a die representation, extracting a pin location of the root clock and pin locations of clock-inputs of the ICG groups from the die representation, and reserving a region on the die representation between the pin location of the root clock and the pin locations of clock-inputs of the ICG groups. The method also includes designing a clock distribution network comprising H trees, wherein the clock distribution network comprises an input pin and a plurality of output pins, with a location of the input pin matching the pin location of the root clock, and pin locations of the plurality of output pins matching the pin locations of the clock-inputs of the ICG groups. The method yet further includes generating a third clock tree by inserting the clock distribution network into the reserved region, with the input pin of the clock distribution network connected to the root clock, and the plurality of output pins of the clock distribution network matching respective ones of the clock inputs of the ICG groups, and physically implementing the die representation including the third clock tree in an integrated circuit.

In yet another aspect, embodiments described herein may provide for a method including providing a first clock tree comprising a root clock and a plurality of levels of integrated clock gates (ICGs) under the root clock and generating from the first clock tree a second a second clock tree comprising a plurality of ICGs in a same level under the root clock. The method also includes reserving a region of an integrated circuit between the root clock and the plurality of ICGs, the region including an interface pin location for the root clock as a first input, and an plurality of second interface pin locations for respective outputs coupled to clock-inputs of the plurality of ICGs, and generating from the second clock tree a third clock tree by inserting buffers under respective ones of the plurality of ICGs for balancing skew, wherein no buffers are inserted into the reserved region. The integrated circuit is implemented on a physical chip. As implemented, at least one ICG of the third clock tree includes a first enablement input, a second enablement input, and a logic gate comprising a first input and a second input, wherein the first input and the second input of the logic gate are coupled to the first and the second enablement inputs, respectively. The ICG also includes a clock input; and a clock output, wherein the ICG is configured to generate and output a clock output signal from a first signal on the clock input in response to receiving enablement signals from the first enablement input and the second enablement input.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method of generating out an integrated circuit, the method comprising:
   providing a first clock tree comprising a root clock and a plurality of levels of integrated clock gates (ICGs) under the root clock;
   generating from the first clock tree a second clock tree comprising a second plurality of ICGs in a same level under the root clock;
   reserving a region of the integrated circuit between the root clock and the second plurality of ICGs, the region including a first interface pin location for the root clock as a first input, and an plurality of second interface pin locations for respective outputs coupled to clock-inputs of the plurality of ICGs; and
   generating from the second clock tree a third clock tree by inserting buffers under respective ones of the second plurality of ICGs for balancing clock skew, wherein no buffers are inserted into the reserved region; and
   implementing the integrated circuit on a physical chip.

2. The method of claim 1 further comprising designing a clock distribution network comprising H trees, wherein the clock distribution network comprises an input matching a location of the first interface pin location, and a plurality of outputs matching respective locations of the plurality of second interface pin locations in the physical chip.

3. The method of claim 2, wherein the clock distribution network further comprises a mesh structure connected to the H trees, wherein the plurality of outputs of the clock distribution network is connected to the mesh structure.

4. The method of claim 1 further comprising inserting the third clock tree into the reserved region.

5. The method of claim 1 further comprising cloning portions of the second plurality of ICGs in the second clock tree.

6. The method of claim 1, wherein the step of generating from the second clock tree a third clock tree by inserting buffers under respective ones of the second plurality of ICGs for balancing clock skew comprises inserting buffers directly under the second plurality of ICGs in the second clock tree.

7. The method of claim 1, wherein each of ICGs in the third clock tree comprises an AND-OR gate comprising two inputs, wherein each of the two inputs is coupled to an enablement signal of the third clock tree.

8. The method of claim 7, wherein the third clock tree further comprises an AND gate comprising two inputs, each coupled to a test enablement signal of the third clock tree, and wherein an additional input of the AND-OR gate is coupled to an output of the AND gate.

9. A method comprising:
   providing a first clock tree comprising a plurality of levels of integrated clock gates (ICGs);
   flattening the plurality of levels of ICGs in the first clock tree to generate a second clock tree comprising a second plurality of ICGs at a same level and under a root clock of the second clock tree;
   placing and routing the second plurality of ICGs in the second clock tree in a die representation;
   extracting a pin location of the root clock and pin locations of clock-inputs of the second plurality of ICGs from the die representation;
   reserving a region on the die representation between the pin location of the root clock and the pin locations of clock-inputs of the second plurality of ICGs;
   designing a clock distribution network comprising H trees, wherein the clock distribution network comprises an input pin and a plurality of output pins, with a location of the input pin matching the pin location of the root clock, and pin locations of the plurality of output pins matching the pin locations of clock-inputs of the second plurality of ICGs; and
   generating a third clock tree by inserting the clock distribution network into the reserved region with the input pin of the clock distribution network connected to the root clock, and the plurality of output pins of the clock distribution network matching respective ones of the clock-inputs of the second plurality of ICGs; and
   physically implementing the die representation including the third clock tree in an integrated circuit.

10. The method of claim 9, wherein the clock distribution network further comprises a mesh structure connected to the H trees, and wherein the plurality of output pins of the clock distribution network is connected to the mesh structure.

11. The method of claim 9 further comprising performing a skew balancing on the second clock tree using a clock tree synthesis (CTS) tool to generate the third clock tree, wherein during the step of skew balancing, no buffers are inserted into the reserved region and between the root clock and the second plurality of ICGs, and wherein a plurality of buffers are inserted into a level under ICGs in the second plurality of ICGs.

12. The method of claim 11 further comprising:
   cloning the ICGs in the second plurality of ICGs in the second clock tree to generate cloned ICGs; and
   redistributing flip flops under the second plurality of ICGs and under the cloned ICGs in the second clock tree.

13. The method of claim 11, wherein the step of skew balancing comprises inserting buffers directly under ICGs in the second plurality of ICGs.

14. The method of claim 11, wherein each ICG in the third clock tree comprises an AND-OR gate comprising two inputs, wherein each of the two inputs is coupled to an enablement signal of the third clock tree.

15. The method of claim 14, wherein the third clock tree further comprises an AND gate comprising two inputs, each coupled to a test enablement signal of the third clock tree, and wherein an additional input of the AND-OR gate is coupled to an output of the AND gate.

16. An method, comprising:
providing a first clock tree comprising a root clock and a plurality of levels of integrated clock gates (ICGs) under the root clock;
generating from the first clock tree a second clock tree comprising a second plurality of ICGs in a same level under the root clock;
reserving a region of an integrated circuit between the root clock and the second plurality of ICGs, the region including an interface pin location for the root clock as a first input, and an plurality of second interface pin locations for respective outputs coupled to clock-inputs of the second plurality of ICGs; and
generating from the second clock tree a third clock tree by inserting buffers under respective ones of the second plurality of ICGs for balancing clock skew, wherein no buffers are inserted into the reserved region;
implementing the integrated circuit including the third clock tree on a physical chip;
wherein at least one ICG of the third clock tree includes:
a first enablement input;
a second enablement input;
a logic gate comprising a first input and a second input, wherein the first input and the second input of the logic gate are coupled to the first and the second enablement inputs, respectively;
a clock input; and
a clock output, wherein the at least one ICG is configured to generate and output a clock output signal from a first signal on the clock input in response to receiving enablement signals from the first enablement input and the second enablement input.

17. The method of claim 16, wherein the logic gate comprises:
an AND gate comprising two inputs connected to the first input and the second input of the logic gate;
an OR gate comprising an input connected to an output of the AND gate; and
a latch comprising an input connected to an output of the OR gate.

18. The method of claim 16, wherein the at least one ICG further comprises a third input, and wherein the method further connecting an AND gate outside of the ICG, wherein the AND gate comprises an output coupled to the third input of the logic gate.

19. The method of claim 18, wherein the third clock tree further comprises two test-enablement signal nodes coupled to two inputs of the AND gate.

20. The method of claim 18, wherein the third clock tree comprises a plurality of ICGs, with each of the plurality of ICGs including matching components, and wherein each of the plurality of ICGs is connected to the output of the AND gate.

* * * * *